(12) United States Patent
Linnell

(10) Patent No.: US 6,971,805 B1
(45) Date of Patent: Dec. 6, 2005

(54) TECHNIQUES FOR PROVIDING MULTIPLE COMMUNICATIONS PATHWAYS

(75) Inventor: Thomas E. Linnell, Northborough, MA (US)

(73) Assignee: E M C Corporation, Hopkinton, MA (US)

( * ) Notice: Subject to any disclaimer, the term of this patent is extended or adjusted under 35 U.S.C. 154(b) by 164 days.

(21) Appl. No.: 10/606,483

(22) Filed: Jun. 26, 2003

(51) Int. Cl.[7] .............................................. G02B 6/36
(52) U.S. Cl. ......................................... 385/89; 385/88
(58) Field of Search .............................. 385/24, 88, 89

(56) References Cited

U.S. PATENT DOCUMENTS

| | | | | |
|---|---|---|---|---|
| 5,825,516 A | * | 10/1998 | Walsh | .......................... 398/40 |
| 6,753,520 B2 | * | 6/2004 | Spirin et al. | ............ 250/227.16 |
| 2002/0141694 A1 | * | 10/2002 | Caplan et al. | ................. 385/24 |

* cited by examiner

*Primary Examiner*—Akm Enayet Ullah
*Assistant Examiner*—Jennifer Doan
(74) *Attorney, Agent, or Firm*—Chapin & Huang, L.L.C.; David E. Huang, Esq.

(57) ABSTRACT

A communications assembly includes a transmitter configured to receive a first electrical input signal and a second electrical input signal, and to provide a light signal having (i) light modulation based on the first electrical input signal and (ii) average power over time based on the second electrical input signal. The communications assembly further includes a receiver configured to receive the light signal and to provide (i) a first electrical output signal based on the light modulation of the light signal and (ii) a second electrical output signal based on the average power of the light signal over time. The communications assembly further includes an optical fiber interconnecting the transmitter with the receiver to convey the light signal from the transmitter to the receiver. Accordingly, the communications assembly provides a robust and reliable mechanism for providing multiple communications pathways using a single light signal through a single optical fiber.

21 Claims, 8 Drawing Sheets

TECHNIQUES FOR PROVIDING MULTIPLE COMMUNICATIONS PATHWAYS

BACKGROUND

A conventional data storage system stores and retrieves data on behalf of one or more hosts (i.e., hosts computers). A typical data storage system includes a controller, a high-speed cache (e.g., semiconductor memory) and an array of disk drives. To store data from a host, the controller typically enters the data into the high-speed cache, and subsequently copies the cached data into the array of disk drives for non-volatile storage. To retrieve data for a host, the controller typically copies the data from the array of disk drives into the high-speed cache if the data does no longer exists in the cache, and then provides the data from the cache to the requesting host.

In some conventional data storage systems, the controller moves the cacheable data between the high-speed cache and the array of disk drives through a high-speed communications medium. For example, to store data from the high-speed cache to the array of disk drives, a transmitter within the controller sends data signals carrying the data through the communications medium to a receiver within the array of disk drives, and processing circuitry within the array subsequently processes these data signals in order to store the data within the disk drives. Similarly, to retrieve data from the array of disk drives, a transmitter within the array sends data signals carrying the data through the communications medium to a receiver within the controller, and the controller subsequently provides the data to the cache as well as to the requesting host.

There are a variety of communications protocols which are well-suited for conveying the data through the communications medium between the high-speed cache and the array of disk drives such as Fibre Channel, various SCSI (Small Computer System Interface) standards, and Serial ATA. One conventional data storage system uses copper wires as the communications medium which moves the data between the high-speed cache and the array of disk drives (e.g., a cable having coaxial or twisted pair lines to carry differential pair electrical signals). Another conventional data storage system uses optical fibers as the communications medium (e.g., a fiber optic cable having a set of optical fibers to carry light signals).

In addition to moving cacheable data between the high-speed cache and the array of disk drives, the controller also communicates with the array of disk drives to obtain environmental information, e.g., to find out which disk drives are available or "online", to find out which disk drives have "failed", etc. There are a variety of conventional approaches to providing communications between the controller and the array of disk drives to convey such environmental information.

One conventional approach to providing communications between the controller and the array of disk drives to convey such environmental information (hereinafter called the "additional physical pathway approach") involves adding a separate physical pathway to carry the environmental information. That is, in addition to the communications medium that carries the cacheable data, the data storage system includes a separate communications medium between the controller and the array of disk drives to carry the environmental information (e.g., separate connectors, separate copper cables, separate fiber optic cables, etc.).

Another conventional approach to providing communications between the controller and the array of disk drives to convey such environmental information (hereinafter called the "in-band electrical signaling approach") involves sending both the cacheable data and the environmental information "in-band". In this approach, transmission of the cacheable data and the environmental information occurs through a single communications medium, e.g., a single copper-based electrical cable. Here, conveyance of the environmental information relies on the same baseband protocol as that used for transmission of the cacheable data.

Yet another conventional approach to providing communications between the controller and the array of disk drives to convey such environmental information (hereinafter called the "copper multiplexing approach") also involves the use of a single copper-based electrical cable for carrying a composite electrical signal containing both the cacheable data and the environmental information. In this approach, the electrical cable conveys the cacheable data as an electrical differential mode signal in accordance with the FC-AL standard (the Fibre Channel Arbitrated Loop Protocol), i.e., the voltage difference between differential signal conductors of the cable defines bits of the data. Additionally, the electrical cable conveys the environmental information as an electrical common mode signal in accordance with the RS-232 standard, i.e., the voltage difference between the differential signal conductors and a ground reference defines bits of the environmental information. A communications mechanism similar to that of the above-described copper multiplexing approach is described in U.S. Pat. No. 5,901,151 entitled "SYSTEM FOR ORTHOGONAL SIGNAL MULTIPLEXING", the teachings of which are hereby incorporated by reference in their entirety.

SUMMARY

Unfortunately, there are deficiencies to the above-described conventional approaches to conveying environmental information between a controller and an array of disk drives of a data storage system. For example, in connection with the above-described conventional additional physical pathway approach, it is expensive to provide a separate communications medium between the controller and the array of disk drives to carry the environmental information. Such an endeavor typically requires additional infrastructure (e.g., a separate Ethernet cable or other form of signal line, connectors, etc.) and space (e.g., circuit board real estate) for these components. Accordingly, this approach significantly increases both component costs and manufacturing costs.

Additionally, in connection with the above-described conventional in-band and copper multiplexing approaches, implementation of these approaches uses copper-based electrical lines which makes these approaches susceptible to a number of drawbacks. For example, since the composite signal is electrical, the composite electrical signal is capable of passing through a copper-based electrical cable but is unsuitable for a high-speed fiber optics medium. Furthermore, the composite electrical signal is a source of electromagnetic interference (EMI) and is also susceptible to EMI. Also, the use of the copper-based electrical cable poses a security concern since the composite electrical signal can be easily intercepted.

Moreover, in connection with the conventional in-band approach, conveyance of the environmental information relies on the baseband protocol being fully operational. That is, if the baseband protocol fails or breaks resulting in loss of the ability to transfer the cacheable data (e.g., due to a component failure), the controller of the data storage system loses its ability to obtain environmental information from the array of disk drives which, in some situations, could otherwise enable the controller to diagnose or perhaps even cure or compensate for the break in order to maintain full data storage system operation.

In contrast to the above-described conventional approaches to providing communications between a controller and an array of disk drives to convey environmental information, embodiments of the invention are directed to techniques for providing multiple communications pathways using a light signal having light modulation to define a first set of data (e.g., cacheable data), and average power which varies over time to define a second set of data (e.g., control/status information). The use of such a light signal enables utilization of a single communications medium for carrying both sets of data (e.g., a single optical fiber) thus alleviating the need for additional components (e.g., multiple cables, additional connectors, etc.) and for additional space (e.g., circuit board real estate for the connectors). Furthermore, in general, such a light signal is impervious to EMI and significantly more difficult to intercept. Also, conveyance of the second set of data (e.g., control/status information) is capable of leveraging off of periodic synchronization light messages thus making the communications pathway for the second set of data less dependent on the success of the first communications pathway (e.g., Fibre Channel Arbitrated Loop messages) for the first set of data, i.e., the second communications pathway may continue even if the first communications pathway fails.

One embodiment of the invention is directed to a communications assembly which includes a transmitter configured to receive a first electrical input signal and a second electrical input signal, and to provide a light signal having (i) light modulation based on the first electrical input signal and (ii) average power over time based on the second electrical input signal. The communications assembly further includes a receiver configured to receive the light signal and to provide (i) a first electrical output signal based on the light modulation of the light signal and (ii) a second electrical output signal based on the average power of the light signal over time. The communications assembly further includes a optical fiber interconnecting the transmitter with the receiver to convey the light signal from the transmitter to the receiver. Accordingly, the communications assembly provides a robust and reliable mechanism for providing multiple communications pathways using a single light signal through a single optical fiber.

In one arrangement, the first electrical input signal defines a first set of data at a first data rate, and the second electrical input signal defines a second set of data at a second data rate that is slower than the first data rate. In this arrangement, the light modulation of the light signal forms a first communications pathway that carries the first set of data at the first data rate, and wherein the average power of the light signal over time forms a second communications pathway that carries the second set of data at the second data rate. Accordingly, such communication pathways do not require complex and more-expensive fiber optic circuitry such as wavelength-division multiplexing components which send different colored light signals through the same optical fiber.

In one arrangement, the receiver is further configured to disable the second electrical output signal in response to loss of the light signal. This enables the receiver to easily distinguish between a long sequence of the same bits (i.e., the bits defined by a low average power) and a loss of signal condition (e.g., due to a component failure or disconnection).

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to techniques for providing multiple communications pathways using a light signal having light modulation to define a first set of data (e.g., cacheable data), and average power which varies over time to define a second set of data (e.g., control/status information). The use of such a light signal enables utilization of a single communications medium for carrying both sets of data (e.g., a single optical fiber) thus alleviating the need for additional components (e.g., a separate physical medium for each set of data, additional connectors, etc.) and for additional space (e.g., circuit board real estate for the connectors). Additionally, such a light signal is generally impervious to EMI and significantly more difficult to intercept or tap into vis-à-vis an electrical signal. Furthermore, conveyance of the second set of data (e.g., control/status information) is capable of leveraging off of periodic synchronization light messages thus making the communications pathway for the second set of data less dependent on the existence of the first communications pathway for the first set of data, i.e., the second communications pathway can continue even if the first communications pathway fails.

Figure 1:
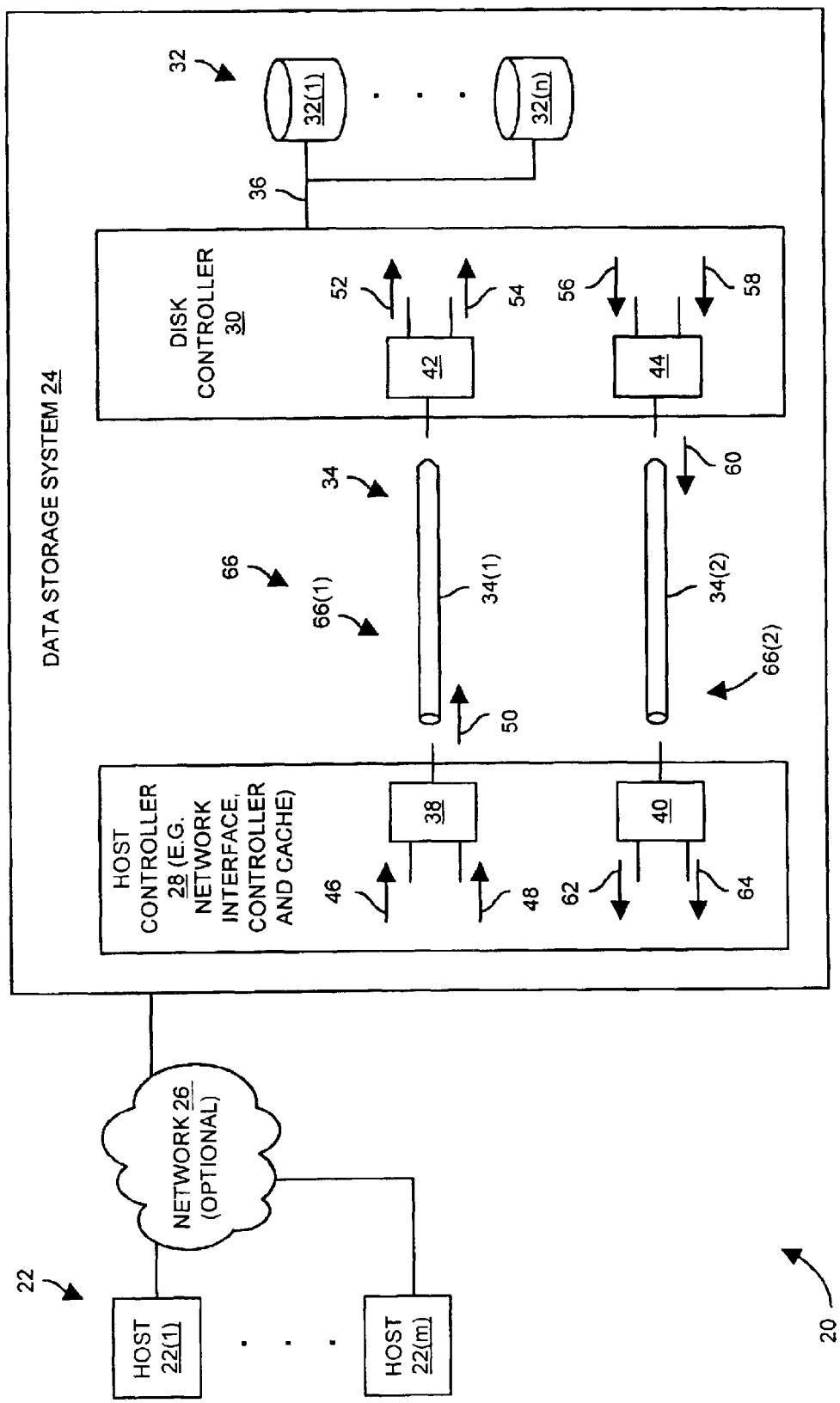
FIG. 1 is a block diagram of a data storage system which is suitable for use by the invention.

FIG. 1 shows a network environment 20 which is suitable for use by the invention. The network environment 20 includes a set of hosts 22(1), . . . , 22(m) (collectively, hosts 22), a data storage system 24, and a network 26 that connects the hosts 22 to the data storage system 24. The data storage system 24 is configured to store and retrieve data on behalf of the hosts 22.

The data storage system 24 includes a host controller 28, a disk controller 30, a set of disk drives 32(1), . . . , 32(n) (collectively, disk drives 32), a set of optical fibers 34(1), 34(2) (collectively, optical fibers 34), and disk drive connections 36. As shown in FIG. 1, the optical fibers 34 enable communication to occur between the host controller 28 and the disk controller 30. Similarly, the disk drive connections 36 (e.g., copper-based connections) enable the disk controller 30 to communicate with the disk drives 32. By way of example only, the host controller 28 further includes network interfacing and caching circuitry to perform network interfacing and caching operations on behalf of the data storage system 24.

As further shown in FIG. 1, the host controller 28 includes, among other things, a transmitter 38 and a receiver 40. Similarly, the disk controller 30 includes, among other things, a transmitter 42 and a receiver 44.

The transmitter 38 of the host controller 28 is configured to receive a first electrical input signal 46 defining a first set of data (e.g., cached data for non-volatile storage), a second electrical input signal 48 defining a second set of data (e.g., control/status signals relating to the operation of the disk drives 32). The transmitter 38 is further configured to generate a light signal 50 (i.e., a composite fiber optic signal) having (i) light modulation based on that first electrical input signal 46 and (ii) average power over time based on that second electrical input signal 48. The transmitter 38 sends the light signal 50 to the receiver 42 of the disk controller 30 through the optical fiber 34(1).

The receiver 42 is configured to receive the light signal 50 from the transmitter 38 through the optical fiber 34(1), and to provide (i) a first electrical output signal 52 based on light modulation of the light signal 50 and (ii) a second electrical output 54 signal based on average power of the light signal 50 over time. The first electrical output signal 52 defines the same first set of data as that of the first electrical input signal 46 received by the transmitter 38, and the second electrical output signal 54 defines the same second set of data as that of the second electrical input signal 48 received by the transmitter 38 (also see FIG. 1). Accordingly, the transmitter 38 of the host controller 28, the receiver 42 of the disk controller 30, and the optical fiber 34(1) form a robust communications assembly 66(1) which provides multiple communications pathways within the data storage system 24 for incoming data heading in the direction toward the disk drives 32.

In a similar manner, the transmitter 44 of the disk controller 30 is configured to receive a first electrical input signal 56 defining a first set of data (a copy of data stored within the disk drives 32), a second electrical input signal 58 defining a second set of data (e.g., environmental information relating to the operation of the disk drives 32). The transmitter 44 is further configured to generate a light signal 60 (i.e., a composite fiber optic signal) having (i) light modulation based on the first electrical input signal 56 and (ii) average power over time based on the second electrical input signal 58. The transmitter 44 sends the light signal 60 to the receiver 40 of the host controller 28 through the optical fiber 34(2).

The receiver 40 is configured to receive the light signal 60 from the transmitter 44 through the optical fiber 34(2), and to provide (i) a first electrical output signal 62 based on light modulation of the light signal 60 and (ii) a second electrical output 64 signal based on average power of the light signal 60 over time. The first electrical output signal 62 defines the same first set of data as that of the first electrical input signal 56 received by the transmitter 38, and the second electrical output signal 64 defines the same second set of data as that of the second electrical input signal 58 received by the transmitter 44. Accordingly, the transmitter 44 of the disk controller 30, the receiver 40 of the host controller 28, and the optical fiber 34(2) form a robust communications assembly 66(2) which provides multiple communications pathways for outgoing data heading in the direction from the disk drives 32.

It should be understood that the each communications assembly 66 provides multiple communications pathways in a diplexing manner. By way of example, cached data defined by the first electrical input signal 46 and control/status messages defined by the second electrical input signal 48 pass through the first communications pathway 66(1) in the form of the single light signal 50 through the single optical fiber 34(1). Moreover, there are no restrictions placed on the signaling protocols, e.g., the cached data is capable of passing through the single optical fiber 34(1) as a Fibre Channel signal, and the control/status messages are capable of passing through the single optical fiber 34(1) using an independent protocol.

Similarly, cacheable data defined by the first electrical input signal 56 and environmental information defined by the second electrical input signal 58 passes through the second communications pathway 66(2) in the form of the single light signal 60 through the single optical fiber 34(2). Again, there are no restrictions placed on the signaling protocols, e.g., the cacheable data is capable of passing through the single optical fiber 34(2) as a Fibre Channel signal, and the environmental information is capable of passing through the single optical fiber 34(2) using a protocol that is independent of the Fibre Channel standard.

Thus, there are multiple pathways in each direction within the data storage system 24 to enable the data storage system 24 to maintain complete and reliable operation if one pathway should fail. That is, the data storage system 24 has an opportunity to compensate or adjust operation since communication in both continues to exist even in the event of a failure of one pathway. Further details of the invention will now be provided with reference to FIG. 2.

Figure 2:
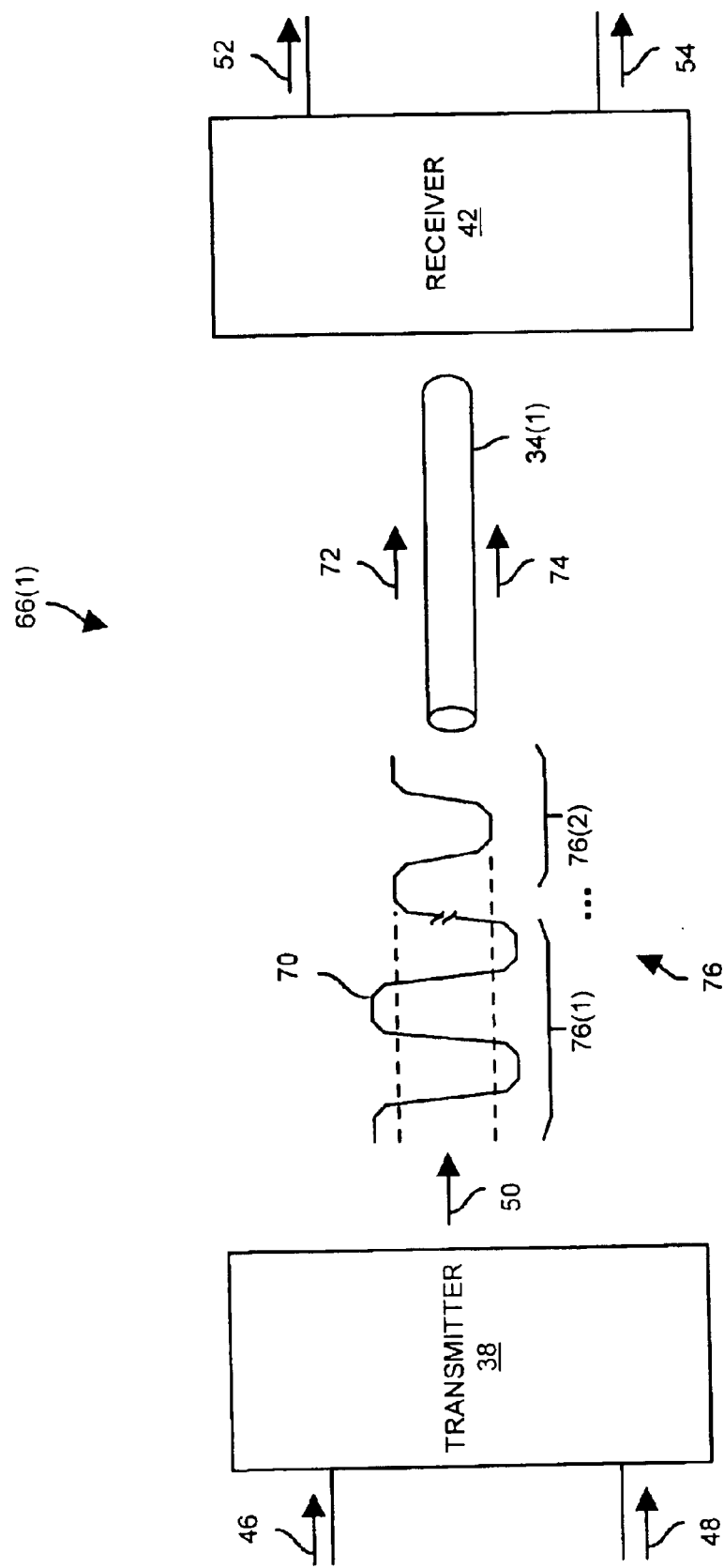
FIG. 2 is a block diagram of a communications assembly of the data storage system of FIG. 1.

FIG. 2 is a block diagram of the communications assembly 66(1) of the data storage system 24. It should be understood that the following explanation applies to both communications assemblies 66(1), 66(2) (generally, communications assemblies 66), even though the following description is provided in the context of the communications assembly 66(1).

As shown in FIG. 2, the transmitter 38 outputs the light signal 50 into one end of the optical fiber 34(1). The light signal 50 includes light energy in the form of intermittent pulses 70. As mentioned earlier, light modulation of the light signal 50 is based on the first electrical input signal 46. In one arrangement, the transmitter 38 varies the timing of the pulses 70 to provide a serial stream of bits of a first communications pathway 72 based on digital data (e.g., a stream of bits) defined by the first electrical input signal 46. It should be understood that a variety of timing formats for defining different bits are suitable for use for such light modulation such as linear modulation, on-off (i.e., the existence of light representing one state, the absence of light representing a different state), pulse width modulation, pulse rate modulation, etc. Accordingly, the communications assembly 66(1) is capable of providing protocol-independent single-wire asynchronous communications through a single point-to-point optical link.

As mentioned earlier, average power of the light signal 50 over time varies based on the second electrical input signal 48 (e.g., a stream of bits). It is common for conventional optical output devices to include power sensing circuitry in order to maintain consistent optical power output, i.e., real-time feedback calibration to provide substantially steady average power. Accordingly, it is fairly straight forward to make use of such power sensing circuitry to enable precise control over the average power over time to provide a second communications pathway 74 in addition to the first communications pathway 72.

In one arrangement, the transmitter 38 varies the amplitude of each light pulse 70 to selectively increase or decrease the average power of the light signal 50 over time to provide a serial stream of bits for the second communications pathway 74. By way of example only and as shown in FIG. 2, the average power of the light signal 50 transitions from having relatively higher average power in one time period 76(1) to relatively lower average power in another time period 76(2) to illustrate transmission of two different bits in the bit stream for the second communications pathway 74. In view of this out-of-band signaling scheme for the second communications pathway 74 using modulation of average power of the light signal 50 over time, the transmitter 38 provides diplex modulation of the light signal 50.

When the receiver 42 receives the light signal 50 through the optical fiber 34(1), the receiver 42 generates the first electrical output signal 52 and the second electrical output signal 54 based on the light signal 50. In one arrangement, the first electrical output signal 52 defines digital data (e.g., a stream of bits) for storage within the data storage system 24, and the second electrical output signal 54 defines digital data (e.g., another stream of bits) relating to the operation of the data storage system 24.

Since the communications assembly 66(1) provides multiple communications pathways through a single transmitter 38, a single receiver 42, and a single optical fiber 34(1), there is no need for additional connectors and for occupation of additional circuit board real estate as in the earlier-described additional physical pathway approach. Furthermore, such optical diplex modulation of the communications assembly 66(1) does not require complex and more-expensive fiber optic circuitry such as conventional wavelength-division multiplexing components which send different colored light signals through the same optical fiber. Accordingly, manufacturing and component costs can be held to a minimum. Further details of the invention will now be provided with reference to FIGS. 3 through 5.

Figure 3:
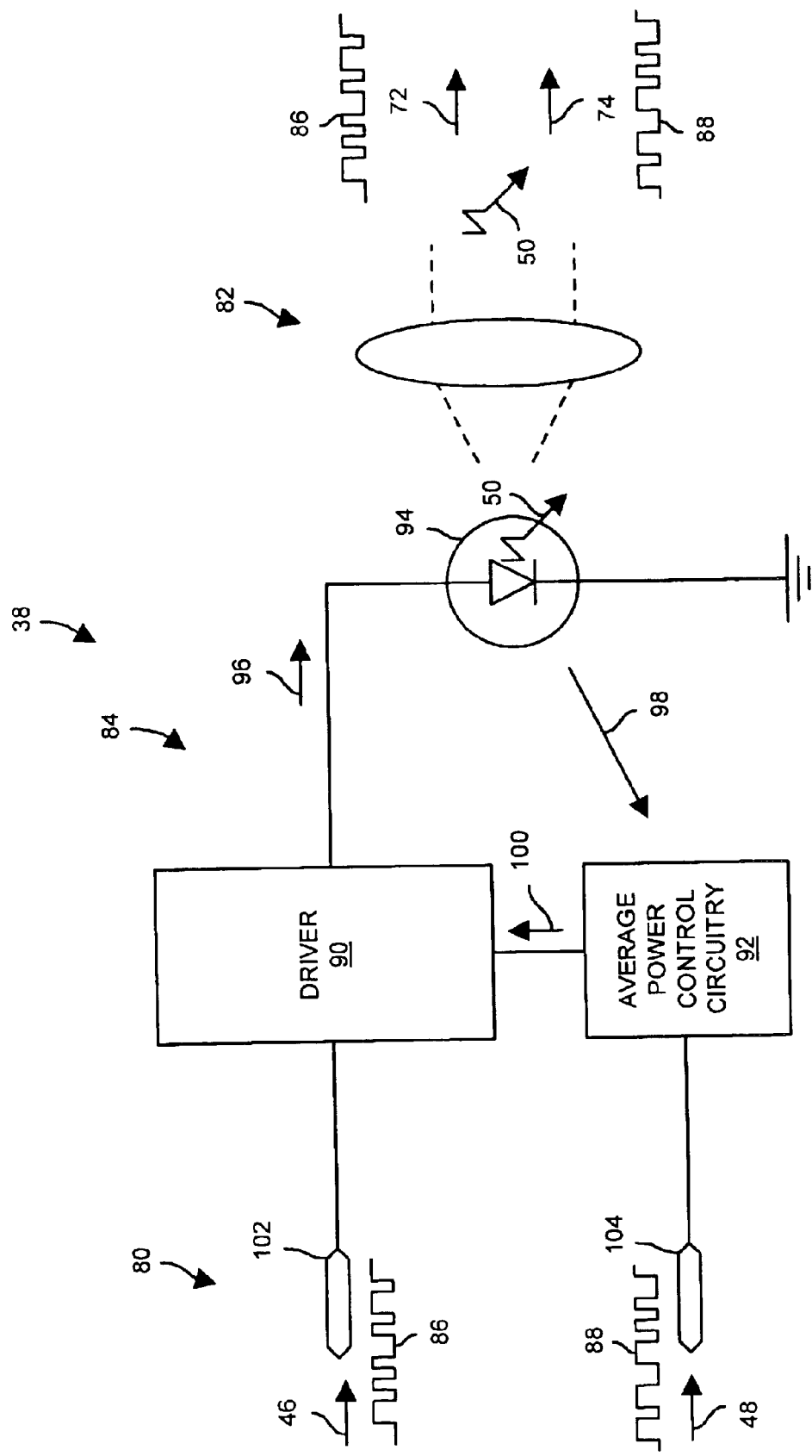
FIG. 3 is a block diagram of a transmitter of the communications assembly of FIG. 2.

FIG. 3 is a block diagram of the transmitter 38 of the communications assembly 66(1) of FIG. 2. The transmitter 38 includes an electrical interface 80, an optical interface 82 and a transmit circuit 84 which is interconnected between the electrical interface 80 and the optical interface 82. The electrical interface 80 is configured to receive the first electrical input signal 46 defining a first set of data 86 (e.g., data for non-volatile storage in the disk drives 32) and the second electrical input signal 48 defining a second set of data 88 (e.g., control/status, environmental information, etc.). The transmit circuit 84 is configured to (i) form the light signal 50 by modulating light based on the first electrical input signal 46 to form the first communications pathway 72 that carries the first set of data 86, and (ii) change average power of the light signal 50 over time based on the second electrical input signal 48 to form the second communications pathway 74 that carries the second set of data 88. The optical interface 82 is configured to output the light signal 50 for conveyance to the receiver 42 through the optical fiber 34(1) (also see FIGS. 1 and 2).

The transmit circuit 84 includes a driver 90 (e.g., a transmit laser driver with signal diplexing/mixing capabilities), average power control circuitry 92 and a light emitting diode 94. The driver 90 provides current 96 through the light emitting diode 94 to generate the light signal 50. The average power control circuitry 92 senses power 98 of the light signal 50 in a feedback manner, and provides an average power control signal 100 to the driver 90. Accordingly, the driver 90 is capable of accurately varying the amplitude of the light pulses 70 of the light signal 50 (also see FIG. 2) in order to provide the second communications pathway 74 (i.e., a bit stream which carries the second set of data 88) while simultaneously varying timing between the light pulses 70 to provide the first communications pathway 72 (i.e., another bit stream which carries the first set of data 86). That is, the driver 90 mixes and generates the diplex light signal 50 in response to both the electrical input signals 46, 48 and the average power control signal 100.

It should be understood that the conventional optical devices are typically constructed so that they provide constant average power within an relatively narrow operating range. This conventional approach provides a guarantee that the circuitry within the conventional optical device provides the proper optical responses (e.g., a substantially linear power response based on current), as well as may alleviate the need for recalibration during the lifetime of the devices. To this end, such conventional optical devices often include power sensing circuitry in order to substantially provide the constant average power.

It should be further understood that embodiments of the invention are suitable for leveraging off of some of the power sensing circuitry of such conventional optical devices. For example, a modification can be made to the power sensing circuitry of the conventional optical devices to form the average power control circuitry 92 of the transmitter 38. However, in contrast to the operation of conventional optical devices that substantially provide constant average power, the transmitter 38 is configured to vary the average power of the light signal 50 to provide the second communications pathway 74. In particular, the average power control circuitry 92 in combination with the driver 90 operate to set the average power of the light signal 50 above a predetermined threshold during a particular time period to provide a first bit value during that particular time period (e.g., "0"), and below the predetermined threshold during that particular time period to provide a second bit value during that particular time period (e.g., "1").

Figure 4:
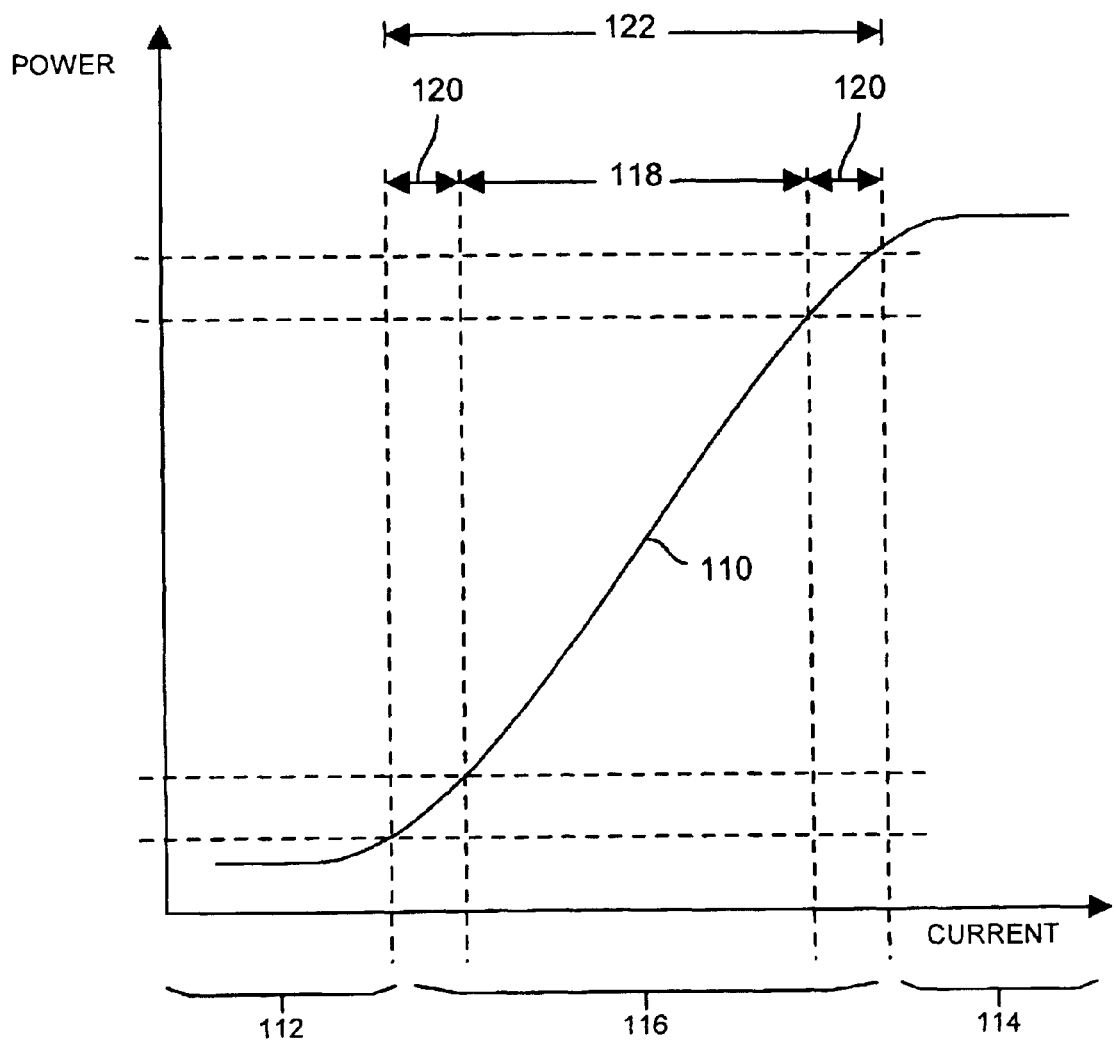
FIG. 4 is a graph illustrating an operating range for a transducer of the transmitter of FIG. 3.

FIG. 4 shows a graphical illustration of the power response 110 (i.e., power from the light emitting diode 94, also see FIG. 3) based on the current 96 for the transmitter 38 of FIG. 3. As shown in FIG. 4, the power response 110 is minimal and relatively flat (i.e., constant) in a low current range 112 (i.e., when the current 96 is low). Additionally, the power response 110 is high and relatively flat in a high current range 114 (i.e., when the current 96 is high). However, the power response 110 varies significantly (e.g., substantially linearly) in response to changes in the current 96 in a middle range 116 between the low and high current ranges 112, 114.

As mentioned above, manufacturers of conventional optical devices typically strive to operate well within linear operating ranges for conventional optical devices thus leaving plenty of margin on both sides of the linear operating ranges. For comparison and by way of example only, FIG. 4 shows a hypothetical linear operating range 118 which would be suitable for use by a manufacturer wanting to utilize the light emitting diode 94 (also see FIG. 3) in a conventional manner. As further shown in FIG. 4, there is additional operating margin 120 on each side of the operating range 1118. For instance, for some conventional optical devices, the sensitivity of optical receivers is often much better than published specifications (e.g., 6 dB) and transmit power is usually better than published specifications (e.g., 2–3 dB). As a result, this excess link budget provides potentially 8–10 dB of available and usable link margin for robust diplex modulation by the communications assemblies 66.

In contrast to the conventional approaches to utilizing light emitting diodes with constant average power, the transmit circuitry 84 of the transmitter 38 is configured to vary the average power of the light signal 50 in order to provide the second communications pathway 74 (FIG. 3). To this end, the transmit circuitry 84 leverages off of excess operating margin of the light emitting diode 94 (e.g., the margins 120 of FIG. 4). In particular, the transmit circuitry 84 operates within a wider operating range 122 and thus enables differences in the average power of the light signal 50 to be detected by the receiver 42 (FIG. 2) and thus form the second communications pathway 74. Further details of the operation of the transmitter 38 will now be provided with reference to FIG. 5.

Figure 5:
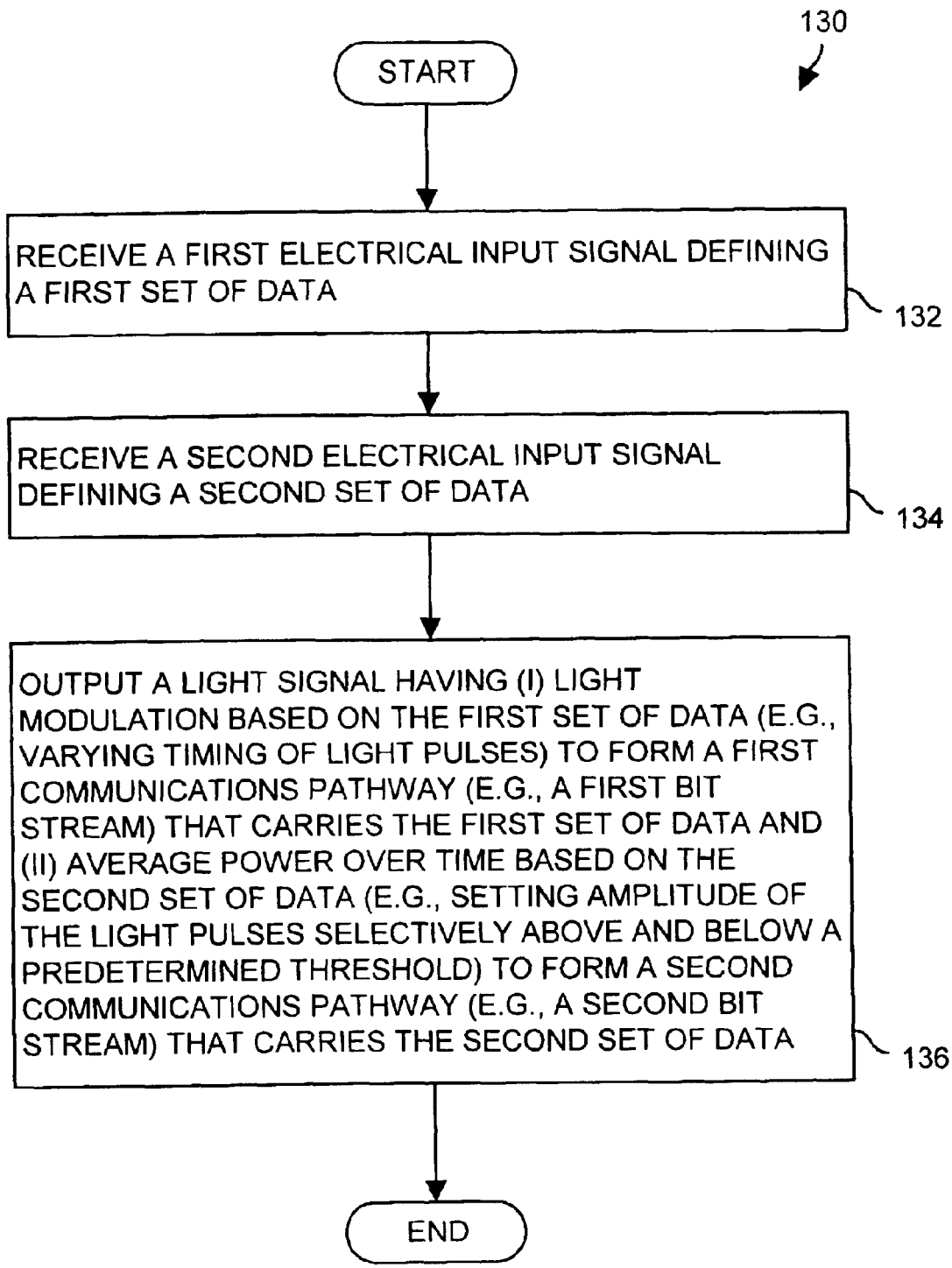
FIG. 5 is a flowchart of a procedure which is performed by the transmitter of FIG. 3.

FIG. 5 is a flowchart of a procedure 130 which is performed by the transmitter 38 of FIG. 3. In step 132, the transmitter 38 receives the first electrical input signal 46 defining the first set of data 86. In particular, the driver 90 of the transmit circuit 84 receives the first electrical input signal 46 on an electrical contact 102 of the electrical interface 80 (also see FIG. 3).

In step 134, the transmitter 38 receives the second electrical input signal 48 defining the second set of data 88. In particular, the average power control circuitry 92 of the transmit circuit 84 receives the second electrical input signal 48 on an electrical contact 104 of the electrical interface 80 (also see FIG. 3).

In step 136, the transmitter 38 outputs the light signal 50 having (i) light modulation based on the first electrical input signal 46 to form the first communications pathway 72 that carries the first set of data 86 and (ii) average power over time based on the second electrical input signal 48 to form the second communications pathway 74 that carries the second set of data 88. FIG. 4 shows an exemplary power response 110 and operating range 122 for the transmitter 38 in order to generate the multi-communications pathway light signal 50 which is output during step 134.

It should be understood that the transmitter 38 is configured to operate continuously. Accordingly, steps 132, 134 and 136 occur concurrently during normal operation of the transmitter 38. In one arrangement, the light signal 50 includes messages in accordance with the Fibre Channel Arbitration Loop (FC-AL) standard. In this arrangement, the transmitter 38 is configured to provide periodic synchronization messages to the receiver 42 (also see FIGS. 1 and 2) even if there is no FC-AL activity in order to maintain synchronization between the transmitter 38 and the receiver 42. Further details of the receiver 42 will now be provided with reference to FIGS. 6 and 7.

Figure 6:
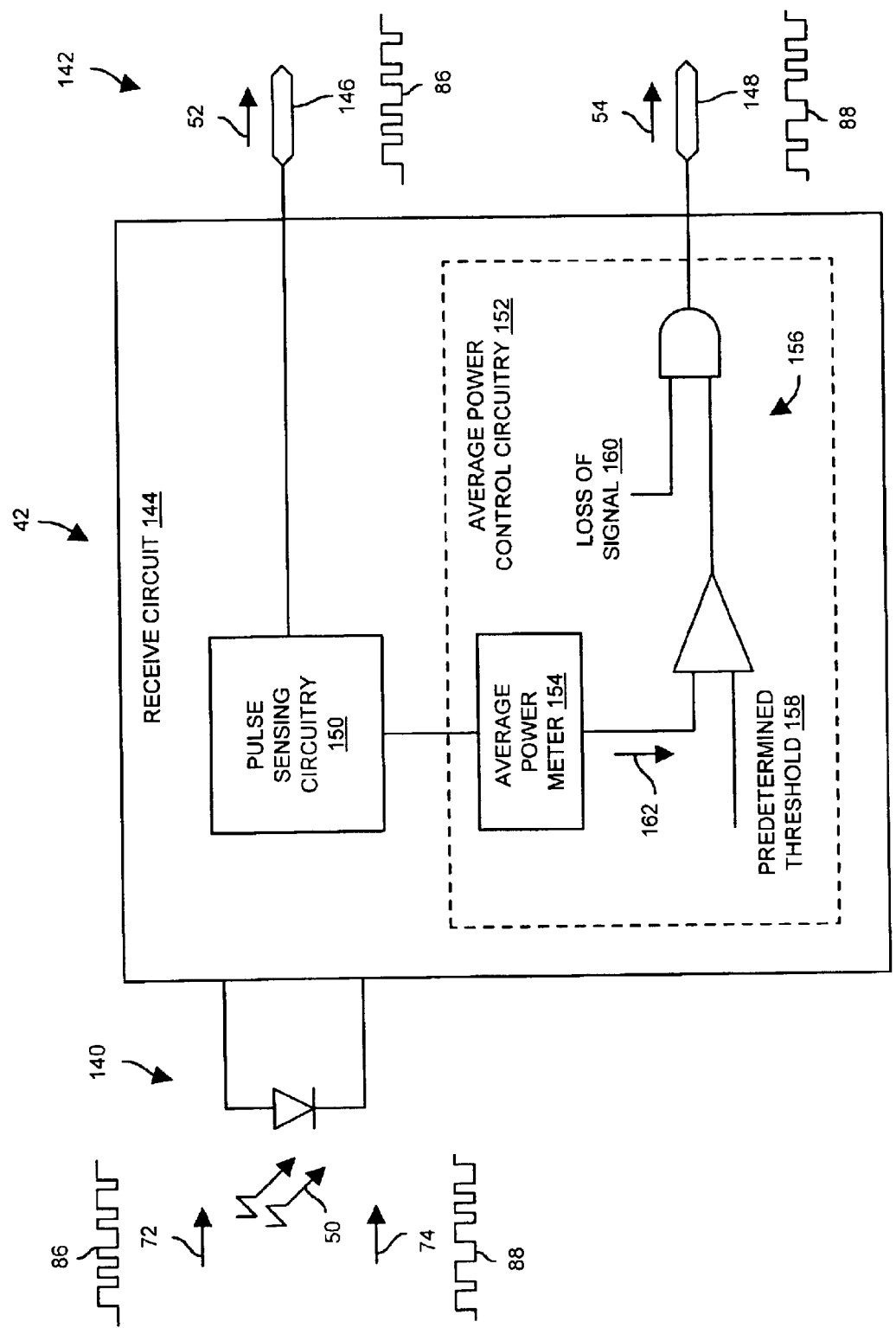
FIG. 6 is a block diagram of a receiver of the communications assembly of FIG. 2.

FIG. 6 is a block diagram of the receiver 42 of the communications assembly 66(1) of FIG. 2. The receiver 42 includes an optical interface 140 (e.g., a photodiode), an electrical interface 142 and a receive circuit 144 which is interconnected between the optical interface 140 and the electrical interface 142. The optical interface 140 is configured to receive the light signal 50 from the optical fiber 34(1) (also see FIG. 2). Recall that the light signal 50 defines both the first communications pathway 72 carrying the first set of data 86 (e.g., cached data for non-volatile storage in the disk drives 32, also see FIG. 3) and the second communications pathway 74 carrying the second set of data 88 (e.g., control/status, environmental information, etc.). In turn, the receive circuit 144 is configured to form the first electrical output signal 52 and the second electrical output signal 54 based on the light signal 50. In particular, the receive circuit 144 provides the first electrical output signal 52 on a first contact 146 of the electrical interface 142 in response to the first set of data 86 to complete the first communications pathway 72 of the communications assembly 66(1) (also see FIG. 2), and further provides the second electrical output signal 54 on a second contact 148 of the electrical interface 142 in response to the second set of data 88 to complete the second communications pathway 74.

As shown in FIG. 6, the receive circuit 144 includes pulse sensing circuitry 150 and average power sensing circuitry 152. The pulse sensing circuitry 150 detects modulation of the light signal 50, and provides the first electrical output signal 52 defining the first set of data 86 in response to the detected modulation. The average power sensing circuitry 152 detects average power of the light signal 50 over time i.e., over a series of time periods 76 (also see FIG. 2), and provides the second electrical output signal 54 defining the second set of data 88 in response to the detected average power of the light signal 50 over time.

As further shown in FIG. 6, the average power sensing circuitry 152 includes an average power meter 154, and additional circuitry 156 (e.g., a comparator, control logic, etc.) which utilizes a predetermined threshold signal 158 and a loss-of-signal signal 160. The average power meter 154 provides a power signal 162. The additional circuitry 156 compares the power signal 162 to the predetermined threshold signal 158 when generating the second electrical output signal 54 defining the second set of data 88. The additional circuitry 156 further disables outputting of the second electrical output signal 54 if the receiver 144 ever determines that it no longer receives the light signal 50. This disabling feature makes the receiver 144 capable of distinguishing between a loss of signal event (which causes generation of the loss-of-signal signal 160 by other detection circuitry) and relatively long periods of certain bits within the light signal 50.

In some arrangements, the additional circuitry 156 further includes clocking and latching circuits that convert the varying average power of the light signal 50 into a well-synchronized series of bits. In these arrangements, a comparator of the additional circuitry 156 is configured to provide, for a particular time period, a bit based on a comparison of the amplitude of the power signal 162 (also see FIG. 6) to the predetermined threshold signal 158. The bit output by the comparator has a first bit value when the amplitude of the power signal 162 is above the predetermined threshold signal 158, and when the amplitude of the power signal 162 is below the predetermined threshold signal 158. Further details of the invention will now be provided with reference to FIG. 7.

Figure 7:
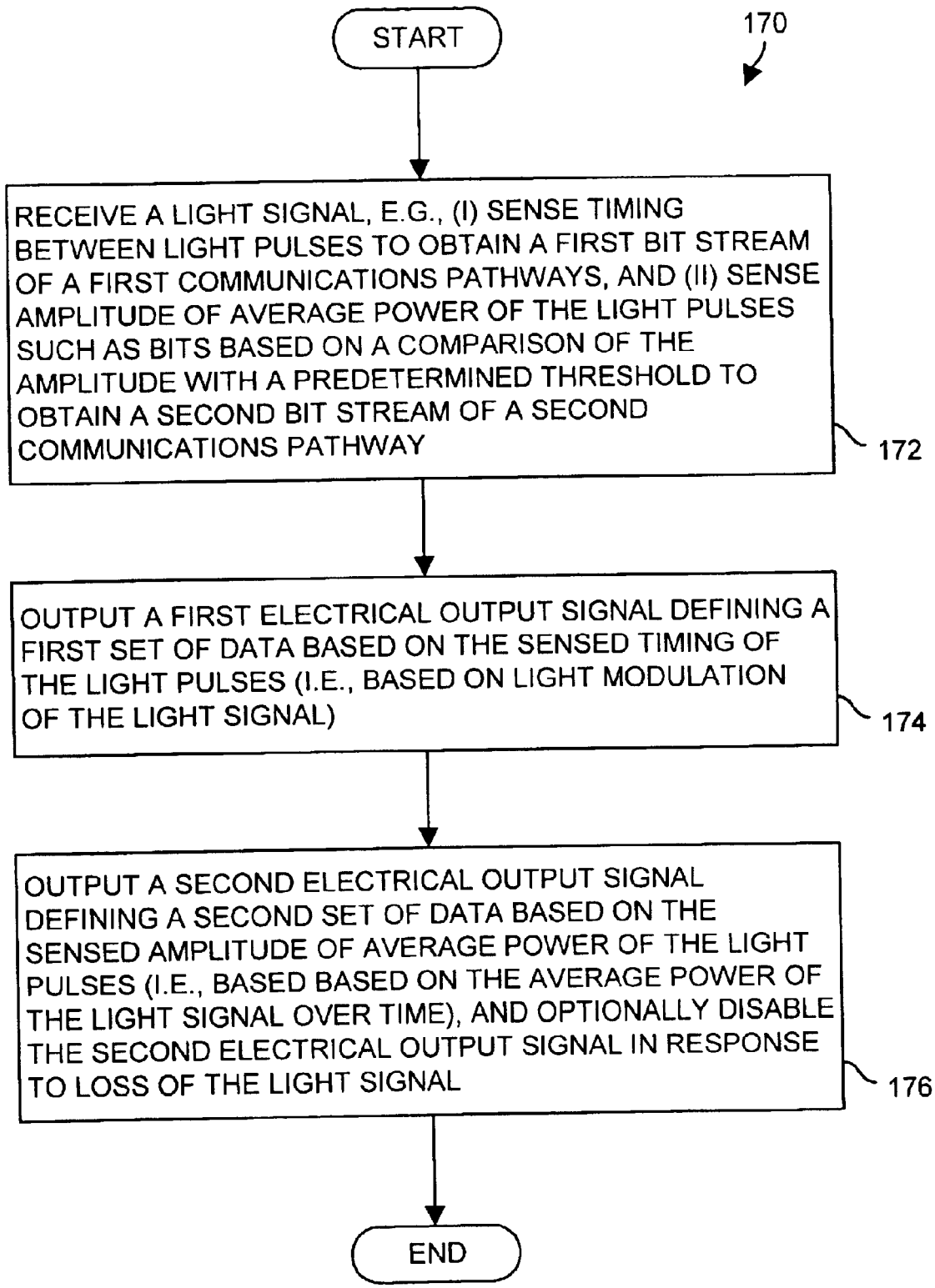
FIG. 7 is a flowchart of a procedure which is performed by the receiver of FIG. 6.

FIG. 7 is a flowchart of a procedure 170 which is performed by the receiver 42 of FIG. 6. In step 172, the receiver 42 receives the light signal 50. In particular, the optical interface 140 (e.g., a PIN-diode, an avalanche-type photodiode, etc.) senses the pulses 70 of the light signal 50 (also see FIG. 2) and provides this information to the receive circuit 144.

In step 174, the receiver 42 outputs the first electrical output signal 52 defining the first set of data 86 based on light modulation of the light signal 50. In particular, the pulse sensing circuitry 150 of the receive circuit 144 generates the first electrical output signal 52 based on such light modulation. As mentioned earlier, a variety of modulation mechanisms are suitable for use such as linear modulation, on-off states, pulse width modulation, pulse rate modulation, etc.

In step 176, the receiver 42 outputs the second electrical output signal 54 defining the second set of data 88 based on average power of the light signal 50 over time. That is, the average power sensing circuitry 152 compares the average power of the light signal 50 to a predetermined threshold to distinguish between the different bit values of the second set of data 88. If should be understood that average power sensing circuitry 152 is also capable of turning off output of the second electrical output signal 54 in response to a detected loss of signal condition.

It should be further understood that the receiver 42 is configured to operate in an ongoing manner. Accordingly, steps 172, 174 and 176 occur concurrently during regular operation of the receiver 42. As mentioned earlier, in one arrangement, the light signal 50 includes FC-AL messages. In this arrangement, the receiver 42 is configured to further receive periodic synchronization messages from the transmitter 38 through the optical fiber 34(1) (also see FIGS. 1 and 2) even if there is no FC-AL activity in order to maintain synchronization between the transmitter 38 and the receiver 42. Accordingly, the light modulation of the light signal 50 forms the first communications pathway 72 which carries the first set of data 86, and the average power of the light signal 50 over time forms the second communications pathway 74 which carries the second set of data 88. Furthermore, if the Fibre Channel Arbitrated Loop should break down for some reason thus loosing the first communications pathway 72, the transmitter 38 and the receiver 42 may still be able to maintain the second communications pathway 74 using the periodic synchronization signals.

As a result, communication between the transmitter 38 and the receiver 42 is not completely dependent on the existence of the baseband protocol (a drawback of the earlier-described conventional in-band approach). Rather, the host controller 28 may be able to utilize the second communications pathway 74 to diagnose, and perhaps even correct or modify operation of the data storage system 24 to compensate for loss of the Fibre Channel Arbitrated Loop and thus keep some or all of the data storage system 24 in robust operation. Further details of the invention will now be provided with reference to FIGS. 8 and 9.

Figure 8:
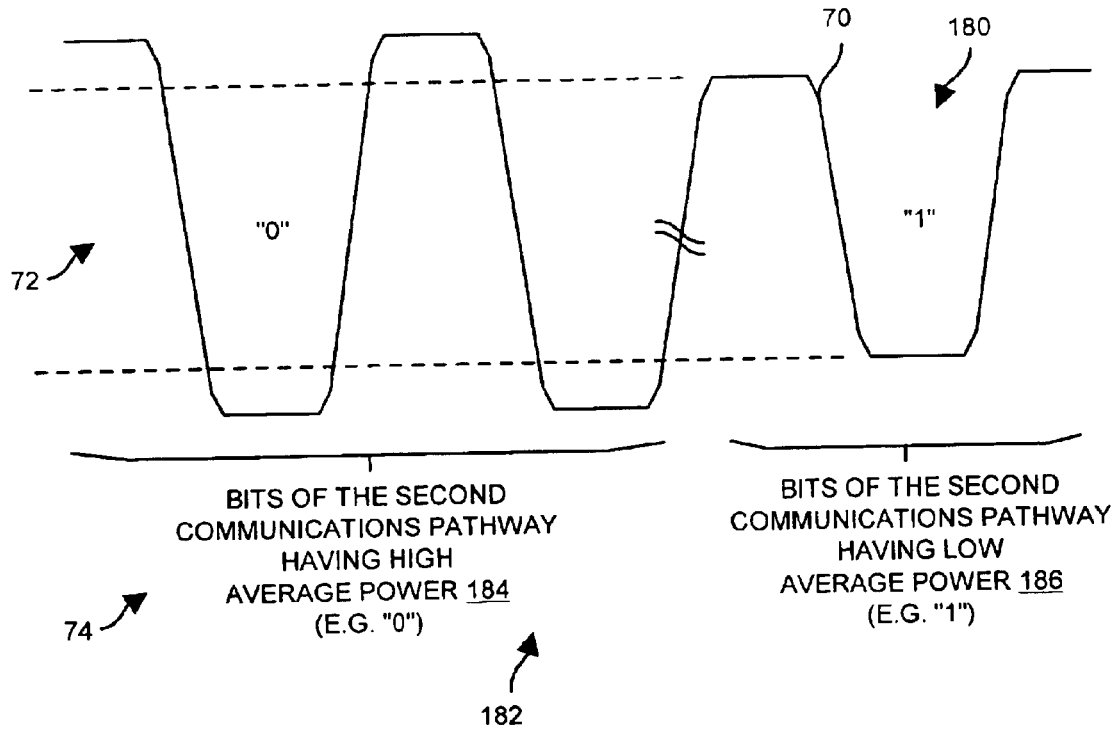
FIG. 8 is a graph illustrating various features of a light signal utilized by the transmitter of FIG. 3 and the receiver of FIG. 6.
Figure 9:
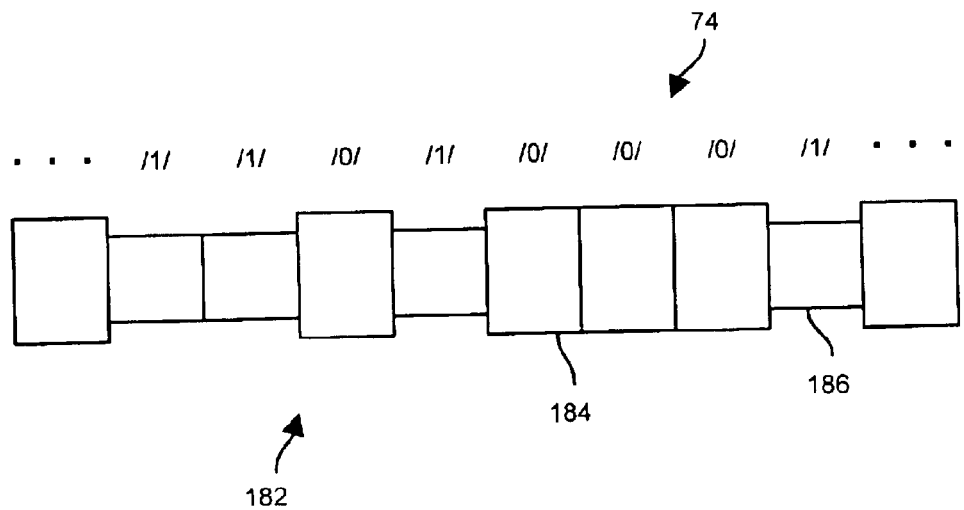
FIG. 9 is an exemplary series of bits which is capable of being defined by the light signal of FIG. 8.

FIG. 8 is a graph illustrating various features of the light signal 50 from a light pulse perspective (i.e., the small scale modulation effect). Furthermore, FIG. 9 is an exemplary series of bits which is capable of being defined by the light signal 50 of FIG. 8 from an average power perspective (i.e., the large scale modulation effect). As shown in FIG. 8, the light signal 50 includes pulses 70 (i.e., light modulations) to provide bits 180 of the first communications pathway 72 (also see FIG. 2). Additionally, as shown in FIGS. 8 and 9, the light signal 50 has varying average power to provide bits 182 of the second communications pathway 74. By way of example only, for the second communications pathway 74, the bits have a first value 184 (e.g., "0") when the average power of the light signal 50 has a relatively high average power value. In contrast, the bits have a second value 186 (e.g., "1") when the average power has a relatively low average power value (see FIG. 9).

As shown in FIG. 9, the bits 182 of the second communications pathway 72 form a low speed bit stream (e.g., a data rate substantially in the range of 56 to 112 Kilobits per second, etc.). The particular bit values 184, 186 are based on whether the average power of the light signal 50 during a particular time period is above or below a predetermined threshold. That is, each bit 182 has a first value if the average power of the light signal 50 is above X dBm, and a second value if the average power is below X dBm, where X is the predetermined threshold (e.g., low average power in a time interval equals "1" or high average power in that time interval equals "0", etc.). As such, the bits 182 of the second communications pathway 74 are essentially defined by amplitude modulation of the average power of the light signal 50 which provides the first communications pathway 72 via standard pulse timing techniques at very high speeds (e.g., 10 Gigabits per second, 2 Gigabits per second, etc.). Accordingly, the light signal 50 includes multiple communications pathways 72, 74 for robust and reliable operation of the data storage system 24 (FIG. 1).

It should be understood that, with the above-described optical diplexing schemes, the second communications pathway 74 is capable of having a significantly faster data rate vis-à-vis the earlier-described conventional mechanisms for providing multiple electrical pathways. For example, in the earlier-described copper multiplexing approach, the data rate for the second pathway is very limited in frequency range. That is, in the copper multiplexing approach, the frequency range for the second pathway must be separated by many decades or octaves in order for the receiver to reject unwanted signals. In contrast, the above-described optical diplexing schemes which were explained above in connection with particular embodiments of the invention use amplitude modulation rather than frequency modulation. Accordingly, these optical diplexing schemes allow for a much higher data rate for the second communications pathway 74.

As mentioned above, embodiments of the invention are directed to techniques for providing multiple communications pathways 72, 74 using a light signal 50 having light modulation to define a first set of data 86 (e.g., cacheable data), and average power which varies over time to define a second set of data 88 (e.g., control/status information). The use of such a light signal 50 enables utilization of a single communications assembly 66 for carrying both sets of data 86, 88 (e.g., a single optical fiber 34(1)) thus alleviating the need for additional components (e.g., multiple cables, additional connectors, etc.) and for additional space (e.g., circuit board real estate for the connectors). Additionally, such a light signal 50 is generally impervious to EMI and significantly more difficult to intercept or tap into vis-à-vis an electrical signal used in a conventional in-band approach or a conventional copper multiplexing approach to providing multiple communications pathways. Furthermore, conveyance of the second set of data 88 (e.g., control/status information) is capable of leveraging off of periodic synchronization light messages thus making the communications pathway 74 for the second set of data 88 less dependent on the existence of the first communications pathway 72 for the first set of data 86, i.e., the second communications pathway 74 can continue even if the first communications pathway 72 fails (e.g., even if a Fibre Channel Arbitrated Loop for the first communications pathway 72 breaks).

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the network 26 (e.g., routers, switches, wireless media, combinations thereof, etc.) that connects the hosts 22 with the data storage system 24 is shown by way of example only. In other arrangements, the network 26 does not exist and the hosts 22 connect directly with the data storage system 24.

Additionally, it should be understood that the communications assemblies 66 were described above as utilizing Fibre Channel communications for the first communications pathway 72 by way of example only. Other formats and standards are suitable for use as well. Moreover, it should be understood that even though most of the above-provided explanation has been given in the context of the communications assembly 66(1), the same explanation applies to the communications assembly 66(2) which provides a light signal 60 in the direction opposite the light signal 50.

Furthermore, it should be understood that the communications assemblies 66 were described above in the context of a data storage system 24 by way of example only. In such a situation, the lengths of communication are capable of residing within a short range such as only a few feet (e.g., less than 15 meters, approximately 10 meters, etc.) or in a distributed manner (e.g., greater than 15 meters). Moreover, the communications assemblies are well-suited for applications other than data storage systems such as general purpose computers, data communications devices, real-time electronics, etc. which may require optical-based communications at extreme lengths such as less than a few meters or in the other extreme of more than 300 meters. Embodiments of the invention are well-suited for such applications.

Additionally, it should be understood that modifications may be made to the above-described communications assembly in order to place the circuitry of the transmitter 38 and/or the receiver 42 into standard circuitry and packaging footprints. In one arrangement, the above-described circuitry complies with the 12C protocol and does not require additional new pins. Such modifications are intended to belong to various embodiments of the invention.

What is claimed is:

1. A data storage system, comprising:
   a host controller configured to communicate with a host, the host controller having a host-end transmitter and a host-end receiver;
   a disk controller configured to communicate with a set of disk drives, the disk controller having a disk-end transmitter and a disk-end receiver; and
   a set of optical fibers which interconnects the host-end transmitter with the disk-end receiver, and which further interconnects the disk-end transmitter with the host-end receiver;
   each transmitter being configured to receive a first electrical input signal and a second electrical input signal, and to provide a light signal having (i) light modulation based on that first electrical input signal and (ii) average power over time based on that second electrical input signal; and
   each receiver being configured to receive a light signal and to provide (i) a first electrical output signal based on light modulation of that light signal and (ii) a second electrical output signal based on average power of that light signal over time.

2. The data storage system of claim 1 wherein the set of optical fibers includes:
   a first optical fiber which connects the host-end transmitter to the disk-end receiver to convey an inbound light signal from the host-end transmitter to the disk-end receiver, light modulation of the inbound light signal forming a first inbound communications pathway that carries a first set of inbound data at a first inbound data rate, and average power of the inbound light signal over time forming a second inbound communications pathway that carries a second set of inbound data at a second inbound data rate; and
   a second optical fiber which connects the disk-end transmitter to the host-end receiver to convey an outbound light signal from the disk-end transmitter to the host-end receiver, light modulation of the outbound light signal forming a first outbound communications pathway that carries a first set of outbound data at a first outbound data rate, and average power of the outbound light signal over time forming a second outbound communications pathway that carries a second set of outbound data at a second outbound data rate.

3. The data storage system of claim 2 wherein the first set of inbound data at the first inbound data rate includes Fibre Channel formatted information for non-volatile storage within the set of disk drives, wherein the second set of inbound data at the second inbound data rate includes environmental information relating to operation of the data storage system.

4. The data storage system of claim 2 wherein the first set of outbound data at the first outbound data rate includes Fibre Channel formatted information retrieved from the set of disk drives, wherein the second set of outbound data at the second outbound data rate includes environmental information relating to operation of the data storage system.

5. A communications assembly, comprising:
   a transmitter configured to receive a first electrical input signal and a second electrical input signal, and to provide a light signal having (i) light modulation based on the first electrical input signal and (ii) average power over time based on the second electrical input signal;
   a receiver configured to receive the light signal and to provide (i) a first electrical output signal based on the light modulation of the light signal and (ii) a second electrical output signal based on the average power of the light signal over time; and
   an optical fiber interconnecting the transmitter with the receiver to convey the light signal from the transmitter to the receiver.

6. The communications assembly of claim 5 wherein the first electrical input signal defines a first set of data at a first data rate, wherein the second electrical input signal defines a second set of data at a second data rate that is slower than the first data rate, wherein the light modulation of the light signal forms a first communications pathway that carries the first set of data at the first data rate, and wherein the average power of the light signal over time forms a second communications pathway that carries the second set of data at the second data rate.

7. The communications assembly of claim 6 wherein the receiver is further configured to disable the second electrical output signal in response to loss of the light signal.

8. A transmitter, comprising:
   an electrical interface configured to receive a first electrical input signal defining a first set of data and a second electrical input signal defining a second set of data;
   an optical interface configured to output a light signal; and
   a transmit circuit coupled to the electrical interface and to the optical interface, the transmit circuit being configured to (i) modulate light within the light signal based on the first electrical input signal to form a first communications pathway that carries the first set of data, and (ii) change average power of the light signal over time based on the second electrical input signal to form a second communications pathway that carries the second set of data.

9. The transmitter of claim 8 wherein the first communications pathway includes a first bit stream that carries the first set of data, wherein the second communications pathway includes a second bit stream that carries the second set of data, and wherein optical interface includes a light emitting diode configured to (i) vary timing between light pulses to provide the first bit stream of the first communications pathway, and (ii) vary amplitude of the light pulses to provide the second bit stream of the second communications pathway.

10. The transmitter of claim 9 wherein the transmit circuit includes:

average power control circuitry coupled to the light emitting diode, the average power control circuitry being configured to direct the light emitting diode to set the average power of the light signal to one of (i) above a predetermined threshold during a particular time period to provide a first bit value during that particular time period, and (ii) below the predetermined threshold during that particular time period to provide a second bit value during that particular time period, the second bit value being different than the first bit value.

11. A receiver, comprising:

an optical interface configured to receive a light signal;

an electrical interface; and a receive circuit coupled to the optical interface and to the electrical interface, the receive circuit being configured to direct the electrical interface to output (i) a first electrical output signal defining a first set of data based on light modulation of the light signal and (ii) a second electrical output signal defining a second set of data based on average power of the light signal over time, the light modulation of the light signal forming a first communications pathway which carries the first set of data, and the average power of the light signal over time forming a second communications pathway which carries the second set of data.

12. The receiver of claim 11 wherein the first communications pathway includes a first bit stream that carries the first set of data, wherein the second communications pathway includes a second bit stream that carries the second set of data, wherein the optical interface includes a photodiode, and wherein receive circuit includes:

pulse sensing circuitry coupled to the photodiode, the pulse sensing circuitry being configured to sense timing between light pulses to obtain the first bit stream of the first communications pathway; and average power sensing circuitry coupled to the photodiode, the average power sensing circuitry being configured to sense amplitude of average power of the light pulses to obtain the second bit stream of the second communications pathway.

13. The receiver of claim 12 wherein the average power sensing circuitry includes:

a comparator configured to provide, for a particular time period, a bit based on a comparison of the amplitude of the average power of the light pulses to a predetermined threshold, the bit having one of (i) a first bit value when the amplitude of the average power of the light pulses is above the predetermined threshold, and (ii) a second bit value when the amplitude of the average power of the light pulses is below the predetermined threshold, the second bit value being different than the first bit value.

14. The receiver of claim 11, further comprising:

a loss-of-signal detector coupled to the electrical interface and to the receive circuit, the loss-of-signal detector being configured to disable the second electrical output signal in response to loss of the light signal.

15. A method for providing multiple communications pathways, the method comprising:

receiving a first electrical input signal defining a first set of data;

receiving a second electrical input signal defining a second set of data; and outputting a light signal having (i) light modulation based on the first electrical input signal to form a first communications pathway that carries the first set of data and (ii) average power over time based on the second electrical input signal to form a second communications pathway that carries the second set of data.

16. The method of claim 15 wherein the first communications pathway includes a first bit stream that carries the first set of data, wherein the second communications pathway includes a second bit stream that carries the second set of data, and wherein outputting the light signal includes:

varying timing between light pulses to provide the first bit stream of the first communications pathway; and varying amplitude of the light pulses to provide the second bit stream of the second communications pathway.

17. The method of claim 16 wherein varying the amplitude of the light pulses includes:

setting the average power of the light signal to one of (i) above a predetermined threshold during a particular time period to provide a first bit value during that particular time period, and (ii) below the predetermined threshold during that particular time period to provide a second bit value during that particular time period, the second bit value being different than the first bit value.

18. A method for providing multiple communications pathways, the method comprising:

receiving a light signal;

outputting a first electrical output signal defining a first set of data based on light modulation of the light signal; and outputting a second electrical output signal defining a second set of data based on average power of the light signal over time, the light modulation of the light signal forming a first communications pathway which carries the first set of data, and the average power of the light signal over time forming a second communications pathway which carries the second set of data.

19. The method of claim 18 wherein the first communications pathway includes a first bit stream that carries the first set of data, wherein the second communications pathway includes a second bit stream that carries the second set of data, and wherein receiving the light signal includes:

sensing timing between light pulses to obtain the first bit stream of the first communications pathway; and sensing amplitude of average power of the light pulses to obtain the second bit stream of the second communications pathway.

20. The method of claim 19 wherein sensing the amplitude of the light pulses includes:

for a particular time period, providing a bit based on a comparison of the amplitude of the average power of the light pulses to a predetermined threshold, the bit having one of (i) a first bit value when the amplitude of the average power of the light pulses is above the predetermined threshold, and (ii) a second bit value when the amplitude of the average power of the light pulses is below the predetermined threshold, the second bit value being different than the first bit value.

21. The method of claim 18, further comprising:

disabling the second electrical output signal in response to loss of the light signal.

\* \* \* \* \*